Aug. 25, 1925. 1,551,386
C. W. GREENE ET AL
CONTROL OF ORDNANCE
Filed Feb. 8, 1923 6 Sheets-Sheet 4
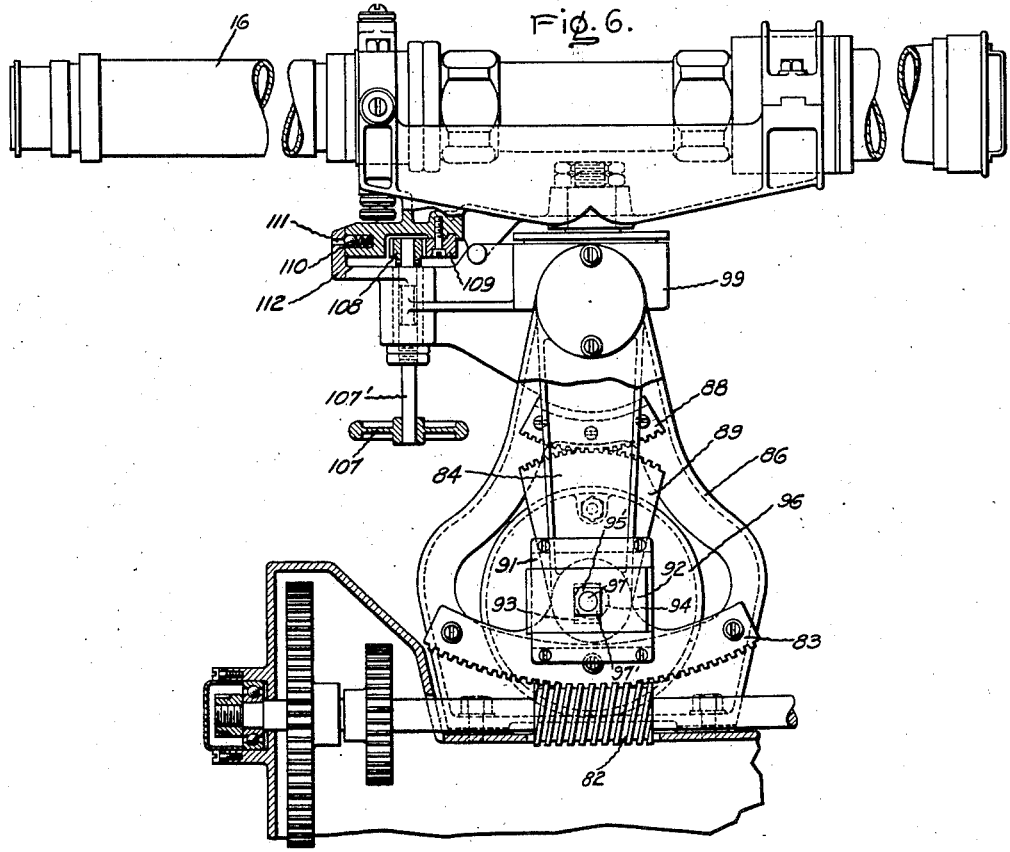
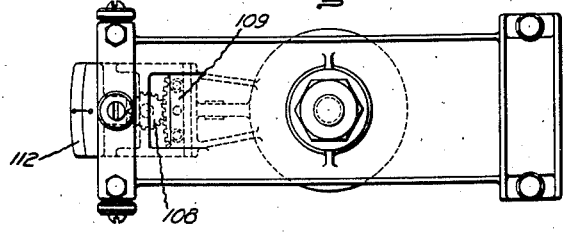
Inventors:
Chester W. Greene,
Alfred A. Brooks,
by
Their Attorney.

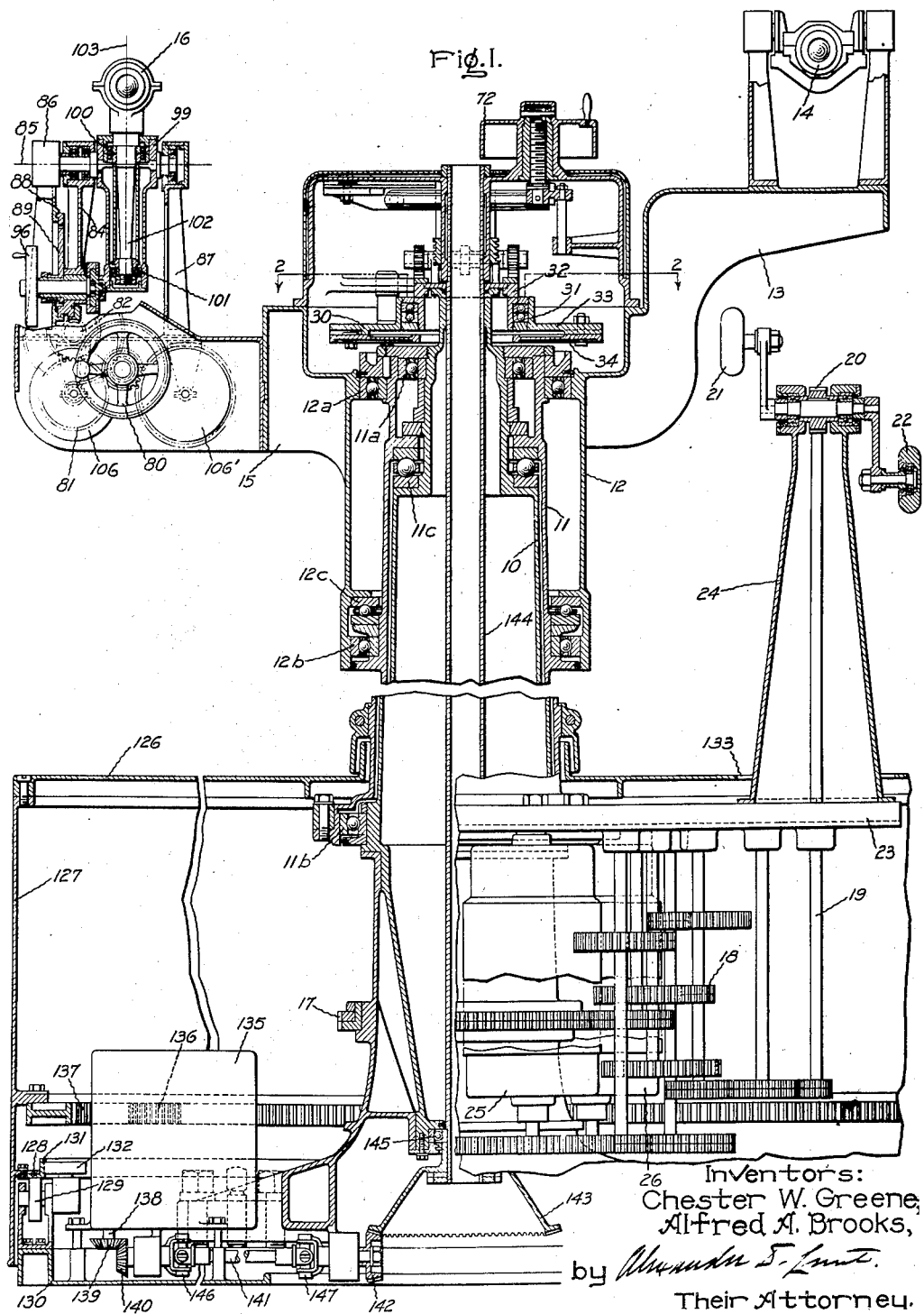

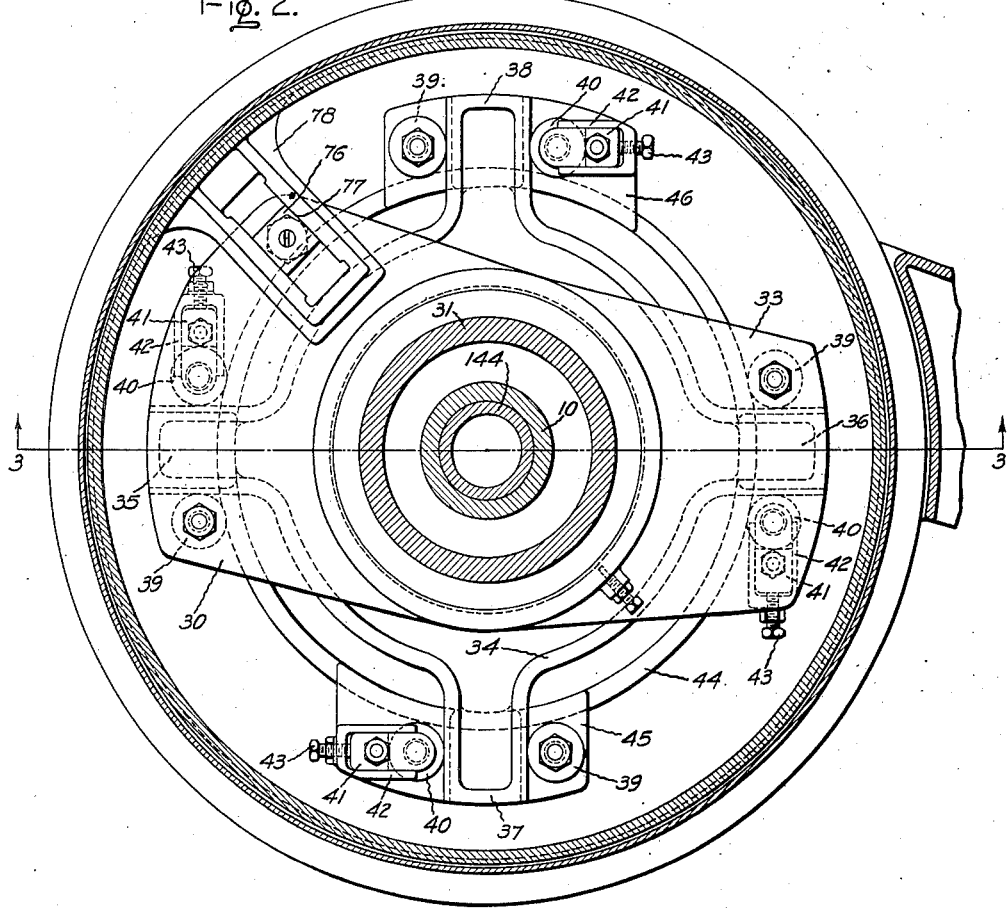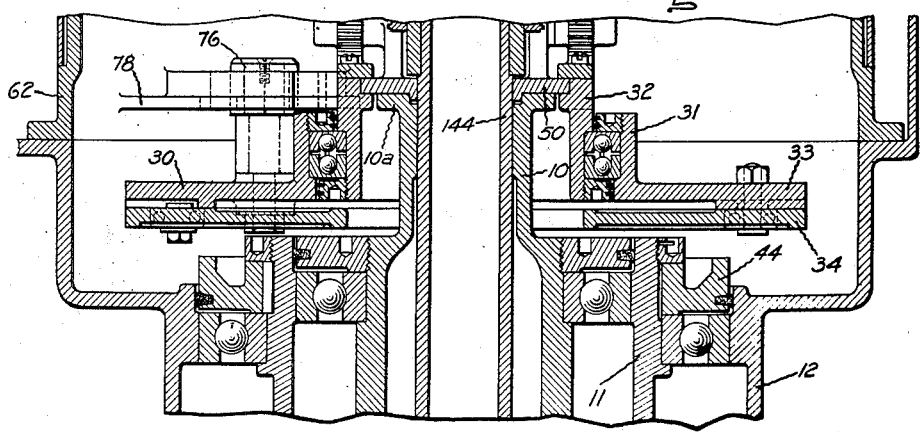

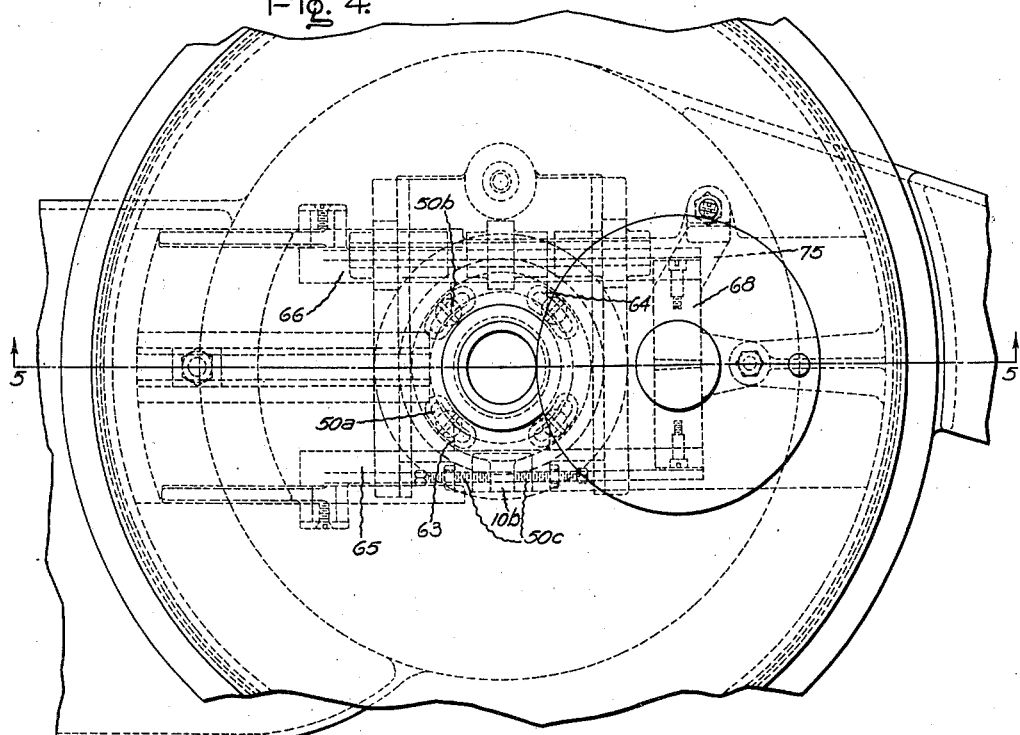
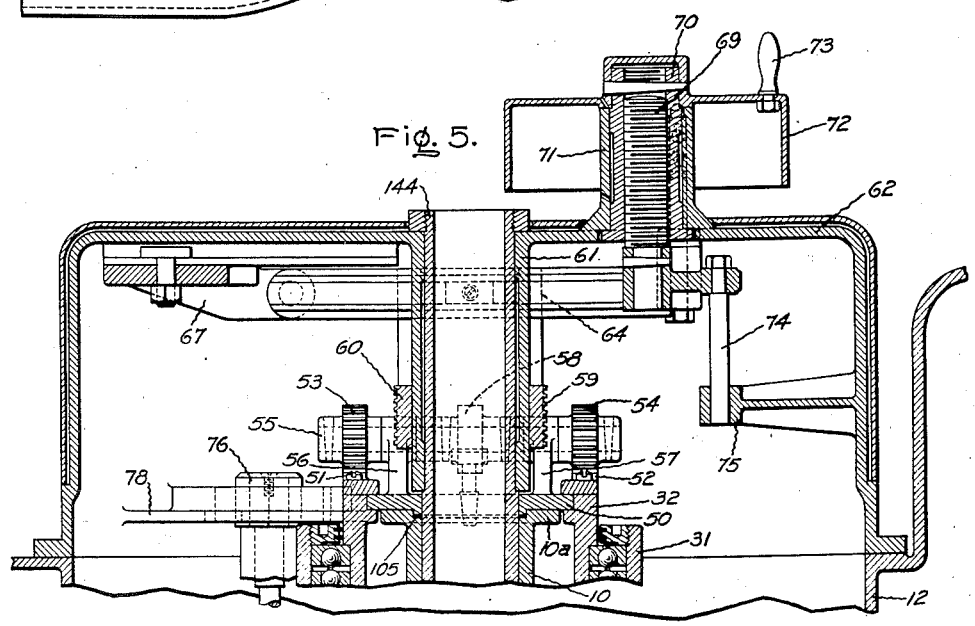

Aug. 25, 1925.
C. W. GREENE ET AL
1,551,386
CONTROL OF ORDNANCE
Filed Feb. 8, 1923    6 Sheets-Sheet 5
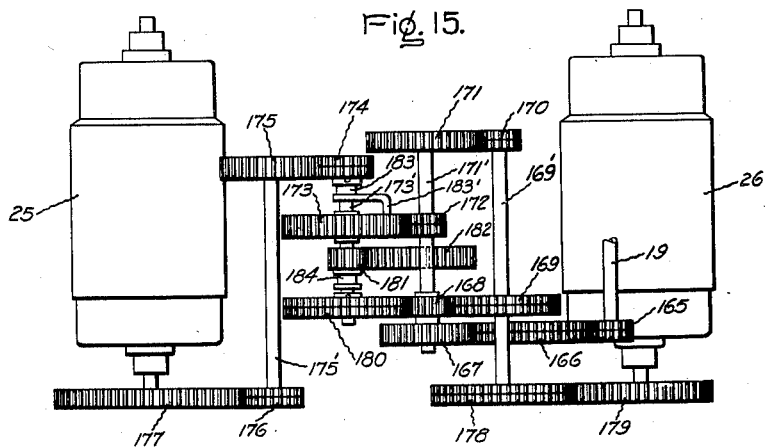
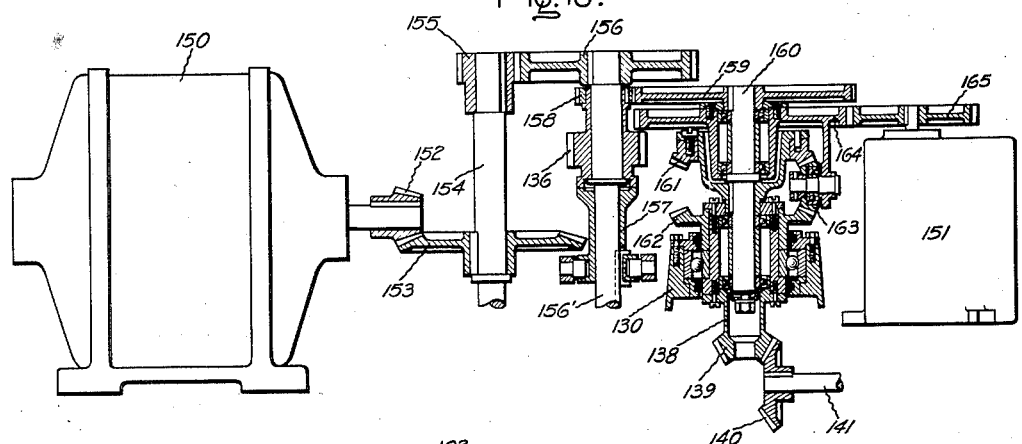
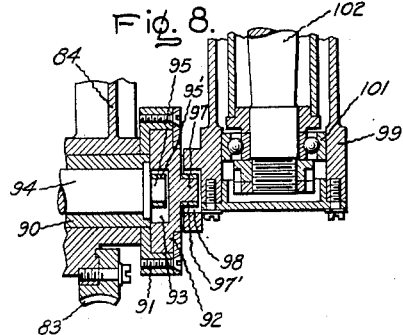
Inventors:
Chester W. Greene,
Alfred A. Brooks,
by
Their Attorney.

Aug. 25, 1925. 1,551,386
C. W. GREENE ET AL
CONTROL OF ORDNANCE
Filed Feb. 8, 1923 6 Sheets-Sheet 6
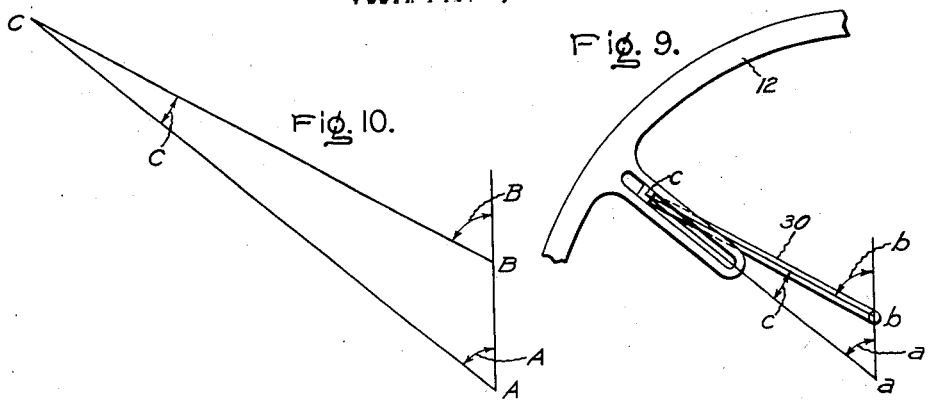
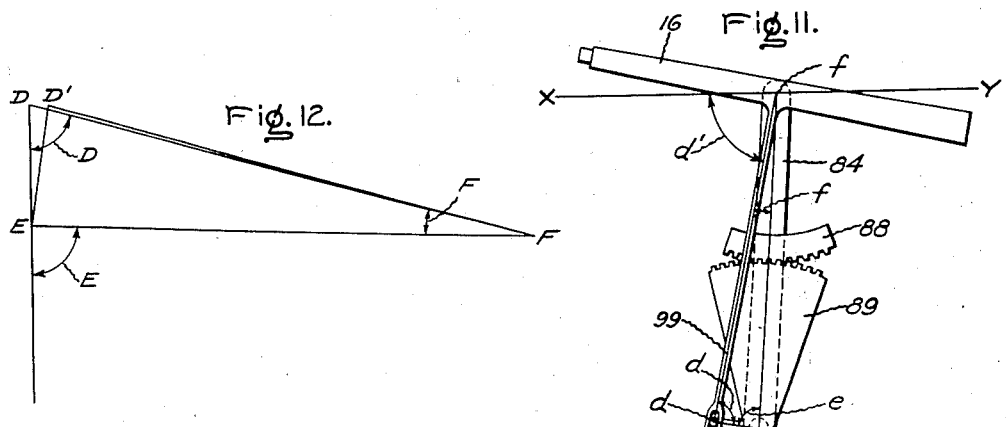
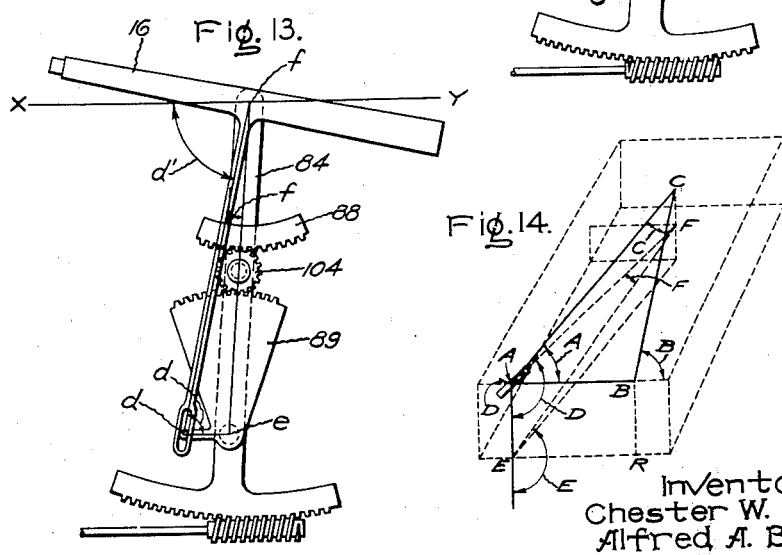
Inventors:
Chester W. Greene,
Alfred A. Brooks,
by
Their Attorney.

Patented Aug. 25, 1925.

1,551,386

UNITED STATES PATENT OFFICE.

CHESTER W. GREENE, OF LYNN, MASSACHUSETTS, AND ALFRED A. BROOKS, OF WELLS-VILLE, NEW YORK, ASSIGNORS TO GENERAL ELECTRIC COMPANY, A CORPORATION OF NEW YORK.

CONTROL OF ORDNANCE.

Application filed February 8, 1923. Serial No. 617,723.

*To all whom it may concern:*

Be it known that we, CHESTER W. GREENE and ALFRED A. BROOKS, citizens of the United States, residing, respectively, at Lynn, county of Essex, State of Massachusetts, and at Wellsville, county of Allegany, State of New York, have invented certain new and useful Improvements in the Control of Ordnance, of which the following is a specification.

Our invention relates to the control of ordnance and the like, more particularly to the control of ordnance from a distance, and has for its object the provision of means whereby ordnance may be directed with accuracy and in a simple, reliable and efficient manner.

While our invention has special application to the control of ordnance, it obviously has application in the control of various other devices, such as searchlights, torpedo tubes, etc.

Our invention has particular application in systems for the control of ordnance on shipboard such, for example, as described and claimed in a copending application of Edward M. Hewlett and Waldo W. Willard, Serial No. 655,358, filed August 2, 1923, assigned to the same assignee as this invention. In systems of this character the guns are directed in accordance with information received from a directing instrument or "director" which is located in a suitable position of advantage, such as aloft. Such a system is of particular advantage when the target is below the horizon at long ranges, or when the target is otherwise obscured from the gun. The function of the director is to generate the bearing of the target and transmit it to the gun.

The director comprises a sighting device which when brought to bear on the target generates the bearing of the target with relation to a fixed base line, usually the projection on the plane of movement of the sighting device of a line passing through the director and the gun. The gun is directed on the target by moving it to a position corresponding to the position of the director, which is accomplished by comparing their movements. Obviously, in comparing the movements of the director and gun, allowance must be made for their difference in position or parallax. Mechanism is therefore provided for automatically introducing a correction for parallax. This parallax mechanism may be associated with the director so that the movements of the director are corrected for parallax, suitable repeater systems being provided for transmitting these corrected movements of the director to the gun. The parallax mechanism may also be associated with the gun, in which case the actual movements of the director would be transmitted and compared with the corrected movements of the gun.

Our invention comprehends improvements in the parallax mechanism as well as improvements in a director equipped with parallax mechanism.

In carrying out our invention we employ two sighting devices, with one of which is associated means for transmitting its movements in azimuth, while with the other is associated means for transmitting its movements in altitude. Associated also with each sighting device we have provided mechanism for correcting its movements for the parallax angle between the sighting device and the receiving station so that the data transmitted gives the direction of the target from the receiving station.

For a more complete understanding of our invention reference should be had to the accompanying drawings, in which Figure 1 is a section view of a director embodying our invention; Fig. 2 is a section view along the line 2—2 of Fig. 1 looking in the direction of the arrows; Fig. 3 is a section view on the line 3—3 of Fig. 2 looking in the direction of the arrows; Fig. 4 is a fragmentary plan view of Fig. 1; Fig. 5 is a section view along the line 5—5 of Fig. 4 looking in the direction of the arrows; Fig. 6 is a fragmentary elevation view partly in section of Fig. 1; Fig. 7 is a fragmentary plan view of Fig. 6 with the telescope removed; Fig. 8 is an enlarged section view of part of the vertical parallax mechanism shown in Fig. 1; Fig. 9 is a diagrammatic view showing the principles of the horizontal parallax mechanism; Fig. 10 is a representation of the triangle solved by the horizontal parallax mechanism; Fig. 11 is a diagrammatic view showing the principles of the vertical parallax mechanism; Fig. 12 is a representation of the triangle solved by the vertical parallax mechanism; Fig. 13 is a diagrammatic view of a modified form of our invention; Fig. 14 is a perspective view of the triangles solved by the parallax mechanisms; Fig. 15 is a diagrammatic view of the driving mechanism for the operator's platform; while Fig. 16 is a diagrammatic view of a gear train between the transmitting devices.

Referring to Fig. 1 of the drawing, in one form of our invention the director comprises a vertical pedestal or supporting member 10 mounted upon which are concentric rotatable sleeves 11 and 12. The sleeve 11 is rotatably mounted concentric with the vertical axis of the pedestal by ball bearings 11ᵃ and 11ᵇ and is supported on the pedestal by a ball thrust bearing 11ᶜ. Similar ball bearings 12ᵃ, 12ᵇ and 12ᶜ are provided in turn on sleeve 11 for rotatably supporting sleeve 12. The pedestal 10 is adjusted so as to stand normally in a vertical position so that the sleeves 11 and 12 are caused to rotate about a vertical axis, this axis being the axis of pedestal 10. The sleeve 12 is provided with a bracket 13 carrying a sighting telescope 14 which is freely movable through a limited range in a vertical plane independently of sleeve 12, but is restrained against movement independently of sleeve 12 in a horizontal or level plane, that is, about the axis of pedestal 10. A second bracket 15 diametrically opposite bracket 13 is also provided on sleeve 12, and mounted on this bracket is a second telescope 16 which has a limited freedom of movement in a horizontal plane, independently of sleeve 12, and is movable in a vertical plane or altitude independently of sleeve 12 by means of mechanism hereinafter described.

Secured to the base of the supporting pedestal 10 is a stationary annular gear 17. Operatively connected to this gear through a suitable gear train 18 is a driving shaft 19 which is actuated through a spiral gearing 20 by handwheels 21 and 22. This operating mechanism consisting of the handwheels 21 and 22, shaft 19 and gear train 18 is mounted on a supporting plate 23 secured to the rotatable sleeve 11 so that upon turning the handwheels, sleeve 11 together with the operating mechanism, is caused to rotate about pedestal 10 in one direction or the other. In this manner, through an operating connection between sleeve 11 and sleeve 12, telescope 14 may be moved in azimuth so as to be brought to bear on the target or point to be observed. Obviously, telescope 16 is at the same time adjusted in azimuth on the target. If necessary, telescope 16 may be given a more accurate adjustment in azimuth independently of sleeve 12. The spiral gearing 20 and handwheels 21 and 22 are mounted in the top of a hollow supporting pedestal 24 secured to plate 23, shaft 19 extending centrally of the pedestal.

Mounted on the supporting plate 23 and interposed in gear train 18 so as to be operated respectively at suitable low and high speed ratios with relation to the angular movement of sleeve 11 about pedestal 10, such as 1:1 and 72:1 are two transmitting devices 25 and 26. These transmitting devices are preferably of the type having a single phase field winding cooperating with a polycircuit armature winding. When telescope 14 is moved in azimuth by handwheels 21 and 22, the transmitting devices 25 and 26 are at the same time rotated in their respective ratios and transmit the angular movement imparted to them to the receiving station provided at the gun. The angle transmitted, however, is not the same as the angular movement given the telescope and differs therefrom by the amount of the parallax angle between the telescope 14 or director and the receiving station. This parallax correction is introduced through mechanism to be presently described, forming the operating connection between sleeve 11 and sleeve 12, by means of which a certain angle equal to the parallax angle is either added to or subtracted from the angular movement of the sleeve 11 in imparting the movement of sleeve 11 to sleeve 12.

The operating connection between sleeve 11 and sleeve 12 comprises a table like arm 30 (Figs. 2 and 3) having on one end a collar 31 mounted on suitable ball bearings carried by a bearing ring 32 which is adjustably supported on the upper end of pedestal 10. Extending laterally from collar 31 opposite arm 30 is a table like projection 33. Arm 30 is connected to sleeve 11 so as to be maintained in a predetermined angular relation therewith by means of a coupling cross 34 surrounding pedestal 10 having diametrically extending arms 35 and 36 slidably engaging respectively with the lower faces of arm 30 and projection 33 and diametrically extending arms 37 and 38 at right angles to arms 35 and 36 slidably engaging with the upper end of sleeve 11. The operative connections with the arms of the cross each comprise two spaced rollers 39 and 40, between which the arm moves, one of the rollers 40 of each pair being mounted on a block 41 slidable in a guide 42 so as to be adjustable with relation to the other roller by means of a set screw 43. By adjusting the set screws all lost motion between the rollers of each pair and the cooperating arm can be taken up. To facilitate the operating connections between arms 37 and 38 and sleeve 11, a ring 44 provided with two opposite integral projections or ledges 45 and 46 is secured to the upper end of the sleeve. The ledges 45 and 46 carry the pairs of rollers cooperating with arms 37 and 38.

The bearing ring 32 is slidably supported at its upper end on a rectangular guide member 50 (Figs. 4 and 5) secured to pedestal 10, whereby the ring may be adjusted laterally and thus made eccentric with the vertical axis of pedestal 10. Preferably the upper end of pedestal 10 is provided with a flange 10$^a$ and is countersunk at 105 to receive a boss on the guide 50. The guide 50 is provided with a plurality of arc shaped slots 50$^a$ (Fig. 4) through which clamping screws 50$^b$ extend into the flange 10$^a$ so as to clamp the guide to the pedestal. This arrangement provides for convenience in adjusting the angular relation of the guide and pedestal, and to provide for accuracy of this adjustment, a lub 10$^b$ is provided on flange 10$^a$, cooperating on opposite sides of which are set screws 50$^c$ carried by guide 50. Secured to ring 32 are two racks 51 and 52 positioned on opposite sides of the guide 50 and extending parallel therewith. Cooperating with the racks 51 and 52 are spur gears 53 and 54 secured to a shaft 55 mounted in bearing posts 56 and 57 secured on guide 50. The spur gears are rotated by a central spur gear 58 secured to shaft 55 which meshes with a circular rack 59 formed on the periphery of a collar 60. As shown, the teeth forming rack 59 extends around the periphery of collar 60 so that the collar may be rotated about the axis of pedestal 10 while being operatively connected to gear 58.

The collar 60 is slidably mounted on a cylindrical guide 61 concentric with the vertical axis of pedestal 10. The guide 61 is integral with a cylindrical cover or casing 62 secured to sleeve 12 and enclosing the upper end thereof.

On opposite sides of the collar 60 are upwardly extending projections 63 and 64 which are pivotally connected to arms 65 and 66. These arms extend approximately at right angles to the axis of pedestal 10 and are pivoted at their left hand ends to a suitable support 67 carried by the casing 62. The levers are joined at their right hand ends by being pivotally connected to a cross bar 68 which carries at its center a screw 69. This screw 69 cooperates with a tapped sleeve 70 rotatably mounted but held against longitudinal movement in a cylindrical extension 71 on the casing 62. To the upper end of sleeve 70 is secured an overhanging protecting cover or handwheel 72 provided with a handle 73 by means of which sleeve 70 may be rotated in one direction or the other as desired.

A rod 74 secured centrally to cross bar 68 cooperates with a guide 75 secured to the casing 62 whereby the cross bar is constrained to move in a path parallel with the axis of pedestal 10. The arms 65 and 66 are channel shaped and serve as guides in which are mounted the operating connections between them and the uprights 63 and 64 and the transverse bar 68. Upon rotation of handwheel 72 therefore screw 69 will be moved in an upward or downward direction as the case may be and this movement transmitted through arms 65 and 66 to the collar 60. The spur gear 58 is thus rotated and its movement transmitted through gears 53 and 54 and racks 51 and 52 to the bearing ring 32. By thus rotating handwheel 72 the eccentricity of the bearing ring with relation to the pedestal 10 may be adjusted as desired and in so doing the position of the pivot point of arm 30 adjusted.

The operating connection between arm 30 and sleeve 12 comprises a rectangular slide 76 (Figs. 2 and 3) secured to the outer end of arm 30 and cooperating with a guide 77 in a radial arm 78 secured to the casing 62.

As thus constructed it will be observed that while the exact movement of sleeve 11 is transmitted to arm 30 through coupling cross 34 this movement is not transmitted to sleeve 12 in case bearing ring 32 is eccentric with the axis of the pedestal because arm 30 and sleeve 12 rotate about different centers. The difference in the two angular movements is the correction for parallax, which is added to or subtracted from the movement of sleeve 11 depending on the angular position of the sleeve on pedestal 10. In case ring 32 is exactly concentric with the axis of pedestal 10, as shown in the drawing, any movement applied to collar 11 is transmitted without change to sleeve 12, and the parallax correction is consequently zero.

The operation of the mechanism will be more easily understood by reference to the diagrammatic representation shown in Fig. 9. Arm 30 is represented as pivoted at a point $b$, located a distance form the axis $a$ of pedestal 10 equal to the eccentricity of collar 31, and also at point $c$ in slider 76. It will be observed that in rotating sleeve 12 through an angle $a$ measured from line $ab$, arm 30 must be rotated through an angle $b$ which is equal to angle $a$ plus angle $c$ of the triangle $abc$.

Referring to Fig. 10, let the triangle ABC be formed by the projections on the horizontal plane of movement of telescope 14, as a plane of reference, of lines joining the director, the receiving station R, and the target F (Fig. 14). For the purpose of explanation we shall consider the director or telescope 14 as located at A, the receiving station or gun at B, and the target at C. It will be observed that the telescope must be trained through an angle A with relation to the base line AB to be directed on the target while from the receiving station this angle is B. It will be observed that angle B equals angle A plus angle C. If the triangle *abc* (Fig. 9) now be made similar to triangle ABC then angle *c* will be equal to the parallax angle C and therefore the sum of the angles *a* and *c* will be equal to the angle B.

The triangle *abc* is made similar to triangle ABC by establishing the relations, angle *a* equals angle A, and $$\frac{ab}{AB} = \frac{bc}{BC}.$$

Angle *a* is generated equal to angle A in bringing the telescope 14 to bear on the target, the mechanism having been initially adjusted to establish this relation. This initial adjustment may be conveniently made by arranging the apparatus such that angles *a* and *b* will be zero when telescope 14 is pointed at the receiving station B. Since *bc* and AB are fixed in length, and also of known length, the relation $$\frac{ab}{AB} = \frac{bc}{BC}$$

may thus be established by adjusting the length of *ab* inversely in proportion to the known range BC. This adjustment is made in the actual apparatus shown in Figs. 1 to 5 inclusive by moving ring 32 on its guide 50 through the agency of handwheel 72. Under actual battle conditions, the range BC is always greater than the base line AB; therefore triangle *abc* is always similar to triangle ABC when the above relations have been established.

It will be observed that as the movement of sleeve 12 is continued in a counterclockwise direction, the parallax angle *c* will gradually increase to a maximum value, assuming a fixed range, and then gradually decrease until when *a* equals 180°, it will be zero. Should the movement of sleeve 12 be continued in a counterclockwise direction the parallax angle *c* will increase from zero in the opposite direction, so as to be subtracted from the angle *a*, to a maximum value and then decrease to zero upon the completion of a revolution. It will thus be observed that when the target lies on the base AB extended the parallax correction is zero regardless of the range. Under these conditions guide 77 is in alignment with guide 50.

The telescope 16 is adjusted in a vertical plane so as to be directed on the same target as telescope 14 by means of a handwheel 80 (Fig. 1) which is operatively connected through a suitable gear train 81 to a worm 82 (Fig. 6) cooperating with a worm gear sector 83 operatively connected to the telescope. Interposed in the connection between the gear sector 83 and the telescope is the mechanism for introducing the parallax correction for telescope 16 in its vertical plane of movement. The gear sector 83 is rigidly secured to the lower end of an arm 84 pivoted about the horizontal axis 85 of the telescope 16. The telescope is mounted on suitable pedestals 86 and 87 which are secured to bracket 15. Secured to the pedestal 86 is a fixed gear sector 88 having for its center the axis 85. Cooperating with gear sector 88 is a movable gear sector 89, having a radius equal to that of sector 88 and secured to a sleeve 90 (Figs. 1 and 8) which is rotatably mounted in arm 84 near its lower end. Secured transversely to the right hand end of sleeve 90 is a rectangular member 91 which forms a support and a guide for a rectangular slider 92. In the left hand face of slider 92 is a slot 93 extending at right angles to the direction of movement of the slider. A shaft 94 extends through sleeve 90, which forms a bearing for the shaft, and carries on its inner end an eccentric pin 95 provided with a rectangular slider member 95' which is slidably fitted in slot 93. A suitable handwheel 96 (Fig. 1) is provided on the outer end of shaft 94 by means of which the shaft can be rotated. Secured to the right hand face of slider 92 directly opposite slot 93 is a pin 97 provided with a suitable rectangular slider 97' which is slidably fitted in a slot 98 in a member 99 carrying the telescope. This member 99 is tubular in form and is provided with suitable ball bearings 100 and 101 for the post 102 carrying the telescope. The telescope is thus mounted so as to be rotatable about an axis 103 normal to both the axis 85 and the line of collination of the telescope. The slot 98 extends in a direction parallel with axis 103.

As thus constructed and arranged it will be observed that by turning handwheel 96 pin 97 can be given any desired amount of eccentricity with relation to the axis of shaft 94 from zero to the total amount of eccentricity of pin 95. Upon movement of telescope 16 about its horizontal axis 85 by means of handwheel 80, it will be observed that gear sector 89, due to its cooperation with gear sector 88, causes rotation of sleeve 90 and hence rotation of the eccentric pin 97 about the axis of sleeve 90. This rotation of pin 97 causes a slight angular adjustment of telescope 16, about its axis 85, for the parallax correction. This adjustment is concurrent with and proportional to the movement being imparted to the telescope by handwheel 80.

In the diagrammatic representation of this mechanism, shown in Fig. 11, let the triangle *def* be formed by lines joining the points of intersection of the axis of pin 97, the axis of sleeve 90, and the axis 85 respectively with a common vertical plane, forming a plane of reference, normal to these axes, this plane preferably being the vertical plane in which telescope 16 is being adjusted. It will be evident that in moving the telescope through its angle of elevation $d'$, measured between a horizontal reference line $xy$ and support 99, the arm must be moved through this angle $d'$ plus a small angle $f$. Referring to Fig. 12, let the triangle DEF be formed by lines joining the director, a point E which is the projection of the director on a horizontal plane passing through the receiving station or gun R, and the target F. For the purpose of explanation we shall consider the receiving station or gun as actually located at E. Obviously, the triangle DEF lies in a vertical plane, which plane is coincident with the plane of triangle $def$. Also the line DE is a vertical base line of fixed and known length. Base line DE corresponds to base line AB of Fig. 10. The above description will be understood by referring to Fig. 14 showing the relation of the triangles ABC and DEF lying in horizontal and vertical plane respectively for a typical case in which the director is located at A, the receiving station or gun at R and the target at F.

It will be observed that the angle of elevation E at the receiving station measured from the vertical base line DE extended is equal to the angle of elevation D at the telescope plus the parallax angle F. Therefore, since angle $d'$ (Fig. 11) is generated equal to angle D, if the angle $f$ is made equal to the parallax angle F, then the arm 84 will have generated the angle E, required to direct a gun at E on the target F.

The operation of this parallax mechanism will be more clearly understood by reference to the modified form shown diagrammatically in Fig. 13. In this form of our invention an idler gear 104 is interposed between the gear sectors 88 and 89. This idler gear is mounted on arm 84, and by its use the movement of gear sector 89 is reversed, whereby side $de$ is maintained parallel to reference line $xy$ in all positions of the telescope. Angle $d$ is therefore generated equal to angle $d'$ and since EF is always greater than DE, by establishing the relation $$\frac{de}{DE} = \frac{ef}{EF}$$

triangle $def$ can be made similar to triangle DEF. But since DE and $ef$ are fixed in value this relation can be established by suitably varying $de$ inversely with EF, the known range of the target from the receiving station E. This adjustment of $de$ is made by turning handwheel 96 so as to adjust the eccentricity of pin 97 equal to desired length of $de$. Angle $f$ is thus made equal to the parallax angle F and consequently the angular movement imparted to arm 84 in bringing the telescope on the target is equal to angle E. It will be observed that triangle $def$ is made similar to triangle DEF by establishing the same relations as are established to make triangle $abc$ (Fig. 9) similar to triangle ABC (Fig. 10).

In the mechanism shown in Fig. 11, however, $de$ is parallel with the reference line $xy$ only when arm 84 is normal to the reference line. At other positions of arm 84, triangle $def$ is not similar to triangle DEF, for it will be observed that in such positions angle $d$ is not generated equal to angle D. Angle $e$ however is generated equal to angle E, so that triangle $def$ will in fact be similar to a triangle D'EF (Fig. 12) in which angle D'EF equals angle E. An error is thus introduced which is zero when arm 84 is at right angles to the reference line and gradually increases from this position, but since the telescope is normally maintained nearly horizontal and consequently arm 84 nearly at right angles to the reference line, this error is too small to appreciably effect the accuracy of the mechanism. For long distance firing it will be observed that the telescope will be pointed practically on the horizon and consequently will lie in a nearly horizontal position.

Interposed in the gear train 81 so as to be operated upon movement of handwheel 80 are two transmitting devices 106 and 106' preferably of the type having a single phase field winding cooperating with a polycircuit armature winding. These transmitting devices are operated at suitable ratios with the angular movement of arm 84 such as one to one (1:1) and seventy-two to one (72:1) respectively, and thus transmit the movements of arm 84 in their respective ratios to the receiving station or gun where it is reproduced by suitable receiving devices (not shown).

The telescope 16 can be adjusted in train by means of a handwheel 107 (Fig. 6), secured to support 99, on the vertical driving shaft 107' of which is a spur gear 108 meshing with a horizontal gear sector 109 carried by the telescope. A spring pressed ball 110 carried by the telescope is adapted to engage with recesses 111 in a cooperating member 112 on support 99 so as to hold the telescope in its adjusted position.

A movable platform 126 for the operators is provided surrounding the base of pedestal 10 (Fig. 1). This platform is in the form of a drum, having a cylindrical vertical supporting portion 127 which is provided with a circular internal supporting rail 128 riding on a plurality of stationary rollers 129. The rollers 129 are spaced around the supporting rail and are mounted on a suitable base plate or support 130. A vertical guiding flange 131 is provided on rail 128. Cooperating with the guiding flange are a plurality of spaced vertical rollers 132 whereby the platform is constrained to move on rollers 129 concentrically with the pedestal. An aperture 133 is provided in the platform through which the pedestal 24 projects.

When sleeve 12 is turned by handles 21 and 22 the platform 126 is automatically rotated a like amount in the same direction so that the relative positions of the operators and the telescopes remain unchanged.

The platform is rotated by a servo-motor driving mechanism 135 actuating a driving gear 136 which cooperates with an internal gear 137 secured concentric with pedestal 10 to the supporting portion 127 of the platform. The platform driving mechanism 135 is secured to the base plate 130 and is controlled by a shaft 138 which is operatively connected through miter gears 139 and 140, shaft 141 and miter gears 142 and 143 to a vertical tubular driving shaft 144. This shaft 144 extends upward through the center of pedestal 10 through guide 61 (Fig. 5) and is secured at its upper end to cover 62 so as to be moved with sleeve 12. A ball bearing 145 is provided in pedestal 10 for the lower end of shaft 144. Preferably shaft 141 is provided with two universal joints 146 and 147.

Referring to Fig. 16 the driving mechanism 135 comprises a servo motor 150 which is automatically controlled by follow-up mechanism operating a suitable drum controller 151. The servo motor is operatively connected through bevel gears 152 and 153, counter shaft 154, spur gears 155 and 156, shaft 156', and clutch 157 to the platform driving gear 136 and also to a spur gear 158. Meshing with spur gear 158 is a spur gear 159 secured to a shaft 160 which carries a bevel gear 161 forming one of the driving gears of a differential, the opposite driving gear 162 of which is driven by shaft 138. A planetary pinion 163 meshes with gears 161 and 162 and is secured to a spur gear 164 mounted on ball bearings on shaft 160. The spur gear 164 meshes with a driving gear 165 for the controller 151. In the arrangement shown, gears 136 and 158 are secured to a sleeve which is rotatably mounted on shaft 156' and provided on its lower end with projections adapted to mesh with similar projections on clutch 157. Shaft 138 is tubular in form and provided with bearings for shaft 160.

As thus arranged any movement of sleeve 12 is transmitted through planetary gear 163 to the controller 151 whereby the motor 150 is caused to operate and drive the platform in the same direction. The motor at the same time through the follow-up mechanism previously described moves the controller back to "off" position. The platform is thus maintained in a predetermined angular relation with sleeve 12.

Referring to Fig. 15 showing in diagrammatic form the gear train 18, under normal operating conditions the movements of shaft 70 19 are transmitted through gears 165, 166, 167, 168 and 169, countershaft 169', gears 170, 171, countershaft 171', gears 172 and 173, countershaft 173', gears 174 and 175, countershaft 175', gears 176 and 177 to the transmitting device 25, and from countershaft 169' through gears 178 and 179 to transmitting device 26. Gears 167 and 168 are secured rigidly together, for example, on a sleeve, and are rotatably mounted on countershaft 171'. Gear 180 is rotatably mounted on countershaft 173' and under normal operating conditions is not used. As driving shaft 19 is turned, gear 181 secured to countershaft 173' rotates turning gear 182 which meshes with the stationary pedestal rack 17 and thus moving the apparatus including sleeve 11 around the pedestal 10. A clutch comprising two slidable sleeves 183 and 184 mounted on shaft 173' is provided. Clutch sleeve 183 is operatively connected to gear 173 by a radial arm 183'. The sleeves are operated together by means of a yoke member (note shown) in a well known manner and are provided with teeth cooperating respectively with similar teeth or gears 174 and 180. With the clutch in the position shown in the drawing, gear 173 is connected to countershaft 173'. When it is desired to move the telescope 14 rapidly through a considerable angle, for example, in shifting from one target to another, the clutch is preferably thrown to a downward position whereby gear 174 is released and gear 180 connected to countershaft 173'. The drive from shaft 19 to the turret rack is now through gears 165, 166, 167, 168, 180, 181 and 182 which gives a lower gear ratio between shaft 19 and the pedestal rack whereby telescope 14 may be swung more rapidly around the stationary pedestal. At the same time it will be observed that the operating ratio between the high speed transmitting device 26 and the pedestal rack is changed to a suitable low speed ratio, such as 9:1. The widths of the clutch teeth are designed so that when the clutch is thrown from slewing position back to normal position, the high speed transmitter is connected again in synchronous relation with the telescope 14.

In operating our invention the operator for telescope 14 rotates handles 21 and 22 until this telescope is adjusted in azimuth on the target, while the operator of telescope 16 at the same time turns handwheel 80 until his telescope is adjusted in altitude on the same target, and if necessary adjust telescope 16 through a small angle in azimuth by turning handwheel 107. At some time, either before or concurrently with the adjustment of the telescope, the range of the target from the receiving station will be set to scale in the two parallax mechanism by turning the handwheels 72 and 96. This range may be determined in any well known manner, such as by means of range finder. To facilitate this adjustment the handwheels will preferably be provided with suitable scales cooperating with stationary pointers. The operation of the director as thus described causes the transmitting devices 25 and 26 to transmit in their respective ratios the direction of the target in azimuth as viewed from the receiving station and transmitting devices 105 and 106 to similarly transmit the direction of the target in altitude as viewed from the receiving station or gun. This information is reproduced in the receiving station by suitable receiving devices and the desired object such as a gun, telescope or searchlight directed in accordance with this information on the target.

In the appended claims it is to be understood that under conditions where the station, object, etc. in question is not actually located in the plane of reference, as under the conditions referred to in the previous description, it is assumed to be located in a corresponding position in the particular plane of reference.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is:—

1. Parallax mechanism comprising a mechanical triangle having a fixed side and an adjustable side, means for adjusting the latter and the angle opposite said fixed side so as to make said mechanical triangle similar to a triangle formed by lines joining an observation station, a second station and a remote object, said adjustable side corresponding to a base line passing through said stations and said fixed side corresponding to the line joining said second station and said object, whereby the angle opposite said adjustable side is made equal to the parallax angle between said stations so that said adjusted angle corrected for said parallax angle gives the bearing of said object from said second station with relation to said base line.

2. Parallax mechanism comprising a mechanical triangle having a fixed side and an adjustable side, means for adjusting the angle opposite said fixed side equal to the angle between lines joining an observation station with a second station and a remote object, and means for adjusting said adjustable side in proportion to the distance between said second station and said remote object, whereby the angle opposite said adjustable side is made equal to the parallax angle between said stations so that said adjusted angle corrected for said parallax angle gives the bearing of said object from said second station with relation to a line passing through said stations.

3. Parallax mechanism comprising a mechanical triangle having a fixed side and an adjustable side, means for adjusting the latter inversely in proportion to the distance between a receiving station and a remote object, means for adjusting the angle opposite said fixed side equal to the angle between lines joining a transmitting station with said receiving station and said object, whereby the angle opposite said adjustable side is made equal to the parallax angle between said stations, and means for transmitting to said receiving station said adjusted angle corrected for said parallax angle.

4. Parallax mechanism comprising a mechanical triangle having an adjustable side of fixed direction, a side of fixed length pivotally mounted on one extremity of said adjustable side, and a side of varying length pivotally mounted on the other extremity of said adjustable side, means for swinging said side of varying length on its pivot to make the angle included with said adjustable side equal to the angle included between lines joining an observation station with a remote object and a second station, and means for adjusting the length of said adjustable side in accordance with the distance between said second station and said object whereby the angle between said fixed side and said adjustable side indicates the bearing of said object with relation to a line passing through said stations.

5. Parallax mechanism comprising a mechanical triangle representing a large triangle formed by lines joining an observation station, a second station, and an object, said mechanical triangle having a fixed side corresponding to the line joining the second station and object, an adjustable side corresponding to a line joining said stations, and a side of varying length corresponding to the line joining the observation station and object, means for varying the length of said adjustable side inversely in proportion to the distance from said second station to said object, and means for adjusting the angle opposite said fixed side equal to the angle included between lines joining the observation station with said object and said second station, whereby the angle included between said fixed side and said adjustable side extended indicates the bearing of said object with relation to a line passing through said stations.

6. Parallax mechanism comprising a mechanical triangle having a fixed side and an adjustable side, means for adjusting the latter inversely in proportion to the distance between a receiving station and a remote object, a sighting device, an operating connection between said sighting device and said triangle whereby the angle opposite said fixed side is made equal to the angle between lines joining a transmitting station with said receiving station and said object by directing the sighting device on said object, and transmitting means associated with said triangle for transmitting the movement of said sighting device corrected for parallax to said receiving station.

7. Parallax mechanism comprising a mechanical triangle having a fixed side and an adjustable side, means for adjusting the latter inversely in proportion to the distance between a receiving station and an object, a sighting device, an operating connection between said sighting device and said triangle so that the angle opposite said fixed side is adjusted equal to the angle between said sighting device and a base line joining a transmitting station with said receiving station by directing said sighting device on said object whereby the angle opposite said adjustable side is made equal to the parallax angle between said stations, and transmitting means associated with said triangle for transmitting the movement of said sighting device corrected for said parallax angle to said receiving station.

8. A director comprising a sighting device, a member pivoted at a point lying in a fixed direction from the axis of rotation of said sighting device, an operating connection between said member and said sighting device so that when sighting device is moved about its axis said member is moved about its pivot, and means for adjusting the distance between the pivot of said member and the axis of said sighting device in proportion to the distance between a remote station and an object so that when said sighting device is directed on the object said pivoted member is moved to a position indicating the direction of the object from said remote station.

9. A director comprising a sighting device, an arm pivoted at one end about an axis parallel with the axis of said sighting device, a pin and slot connection between the other end of said arm and said sighting device, and means for adjusting the distance between the pivot of said arm and the axis of said sighting device inversely in proportion to the distance between a remote station and an object so that when said sighting device is directed on said object said arm is caused to generate an angle with relation to a line passing through its pivot and the axis of said sighting device giving the bearing of said object from said remote station with relation to a line passing through said sighting device and remote station.

10. A director comprising a sighting device, a rotatable support therefor, a member rotatable about the axis of said support, a second member rotatable about an axis parallel with the axis of said support and operatively connected to said first rotatable member so as to be maintained in a predetermined angular relation therewith, an operating connection between said second rotatable member and said support, and means for adjusting the distance between the axis of said second rotatable member and the axis of said support in proportion to the distance between a remote station and a target so that when said sighting device is directed on said target said first rotatable member is caused to describe an angle giving the direction of said target from said remote station.

11. A director comprising a sighting device, a support therefor rotatable about a vertical axis, a member rotatable about the axis of said support, an adjustable bearing eccentric with the axis of said support, an arm pivoted on said bearing and operatively connected to said rotatable member so as to be maintained in a predetermined angular relation therewith, an operating connection between said arm and said support, and means for adjusting the eccentricity of said bearing inversely in proportion to the distance between a remote station and a target, so that when said sighting device is directed on said target said rotatable member is caused to describe an angle giving the bearing of said target from said remote point with reference to a base line passing through the director and said remote point.

12. A director comprising a stationary supporting pedestal, a sleeve rotatably mounted on said pedestal, a support rotatably mounted on said sleeve, a sighting device, carried by said support, an operating connection between said sleeve and said support including correcting means whereby movements of said support are applied to said sleeve corrected for parallax between said director and a remote receiving station, and means for transmitting the movements of said sleeve to said receiving station.

13. A director comprising a stationary supporting pedestal, a sleeve rotatably mounted on said pedestal, a support rotatably mounted on said sleeve, said sleeve and said support having a common axis of rotation, a member rotatable about an axis parallel with said common axis, an operating connection between said member and said sleeve whereby said member is maintained in a predetermined angular relation with said sleeve, an operating connection between said member and said support, a sighting device carried by said support movable with said support about said common axis, and means for adjusting the distance between the axis of said member and said common axis in proportion to the distance between a remote station and a target so that when said sighting device is directed on said target said sleeve is caused to describe an angle giving the bearing of said target from said remote station.

In witness whereof, CHESTER W. GREENE has hereunto set his hand this 25th day of January 1923, and ALFRED A. BROOKS has hereunto set his hand this 2nd day of February 1923.

CHESTER W. GREENE.
ALFRED A. BROOKS.